2,422,240

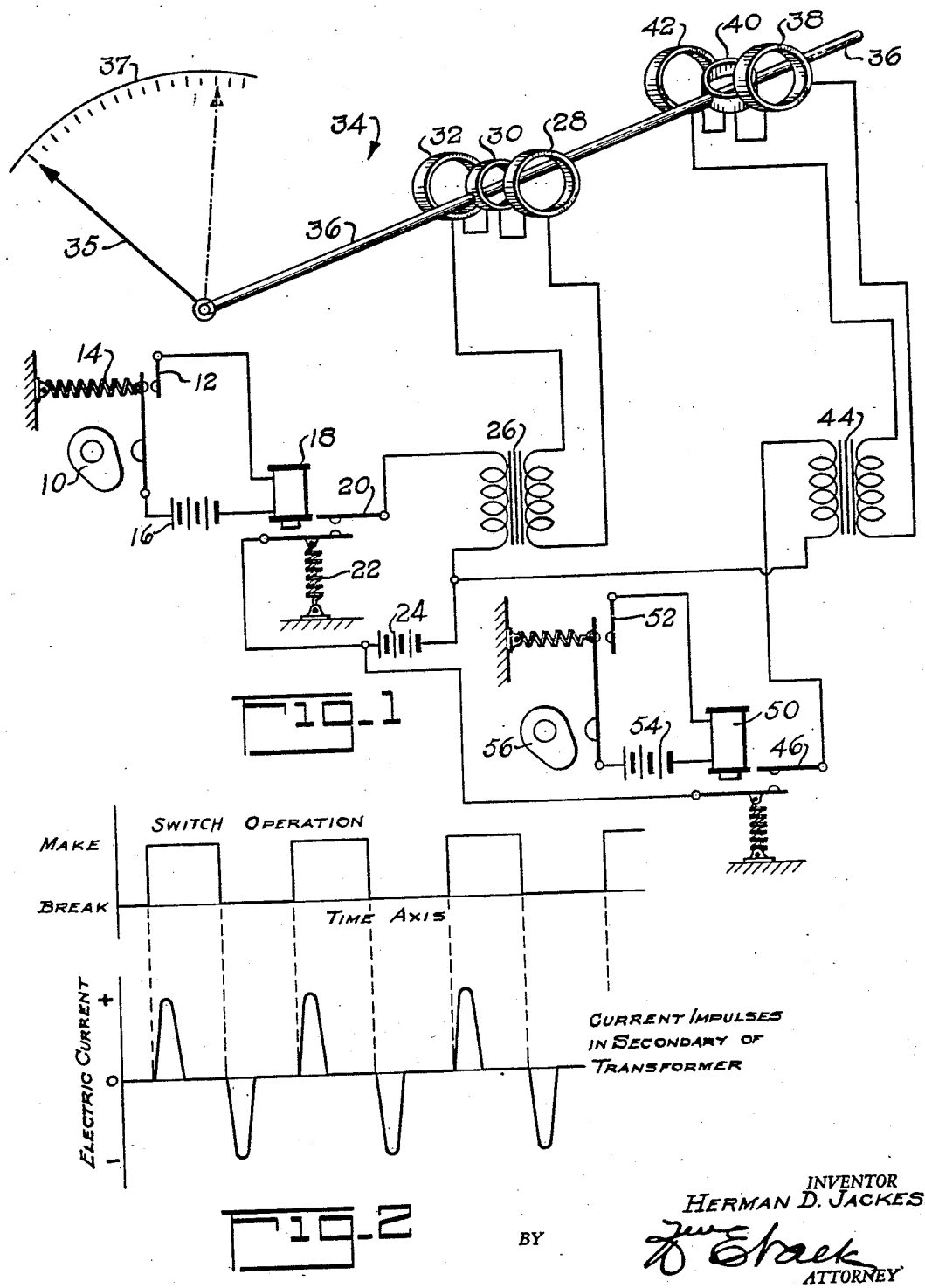
June 17, 1947.  H. D. JACKES  2,422,240
ELECTRICAL RATIO INDICATING INSTRUMENT
Filed June 23, 1943  2 Sheets-Sheet 1
INVENTOR
HERMAN D. JACKES.
BY
ATTORNEY June 17, 1947.  H. D. JACKES  2,422,240
ELECTRICAL RATIO INDICATING INSTRUMENT
Filed June 23, 1943  2 Sheets-Sheet 2
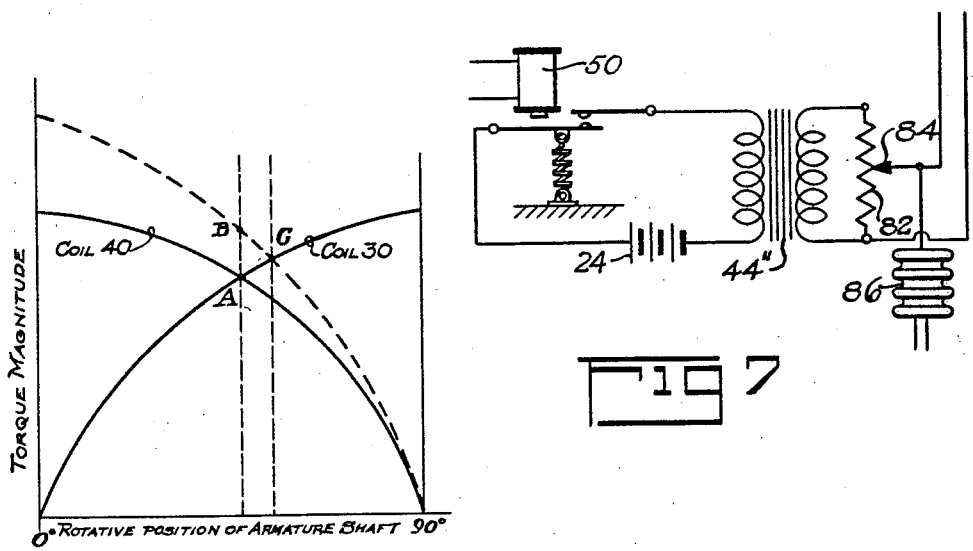
Fig. 3
Fig. 7
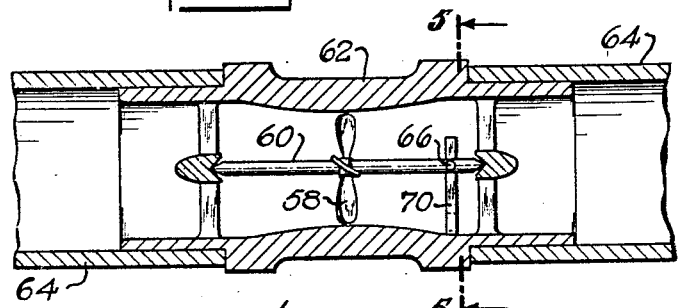
Fig. 4
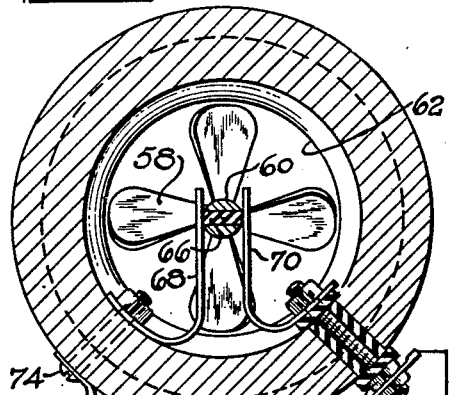
Fig. 5
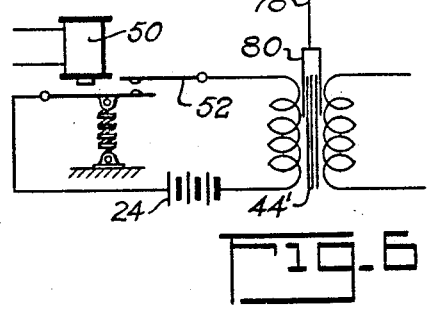
Fig. 6
INVENTOR
HERMAN D. JACKES.
BY
ATTORNEY Patented June 17, 1947

UNITED STATES PATENT OFFICE 2,422,240

ELECTRICAL RATIO INDICATING INSTRUMENT

Herman D. Jackes, Bloomfield, N. J., assignor to Wright Aeronautical Corporation, a corporation of New York Application June 23, 1943, Serial No. 492,192

5 Claims. (Cl. 171—95)

1

This invention relates to indicating or measuring apparatus and is particularly directed to apparatus for indicating or measuring the ratio of two or more variables.

It is an object of this invention to provide a relatively simple instrument for continuously indicating and/or measuring the ratio of two variables. It is a further object of this invention to provide an electric instrument for indicating and/or measuring the ratio of two variables in which the instrument comprises two sets of windings, each connected with a separate source of electric energy controlled by one of the variables.

Specifically, it is an object of this invention to provide an instrument adapted to measure the instantaneous values of gasoline mileage, horsepower output, and specific fuel consumption of an internal combustion engine, although the invention is not limited to these specific uses. Other objects of this invention will become apparent upon reading the annexed detailed description in connection with the drawing in which:

Fig. 1 is a schematic layout of an instrument embodying this invention together with the control circuits therefor, Fig. 2 is a graphical illustration of the make-and-break operation of one of the cam-controlled switches and the current flow in an associated transformer secondary circuit, Fig. 3 is a graph illustrating the torque characteristics of the moving coils of the instrument, Fig. 4 is a section of a fuel flow meter, Fig. 5 is an enlarged section on line 5—5 of Fig. 4, and Figs. 6 and 7 are views illustrating modifications of Fig. 1.

Referring to Fig. 1, a rotating cam 10 operates to make and break the switch 12 at a frequency proportional to the speed of rotation of the cam, the switch 12 being biased toward its open position by a spring 14. The switch 12 is connected in circuit with a battery 16 and a relay 18 and this relay, when energized, operates to close a switch 20 biased to open position by a spring 22. The switch 20 is connected in series with a battery 24 and the primary winding of a transformer 26. The operation of the switch 20 thereby corresponds to the operation of switch 12. Obviously, the switch 12 could be connected directly to the transformer 26 but with the cam 10 located at some remote point the use of a relay circuit is preferable. Also, it is much easier to maintain the relay contacts clean than the cam contacts since, as will appear, the cam is driven by one of the variables to be measured.

2

The secondary or output winding of the transformer 26 is connected in series with a set of windings 28, 30, and 32 of the meter 34. The windings 28 and 32 are fixed in position while the winding 30 is secured to the freely pivoted armature shaft 36 carrying a pointer or indicator 35, movable relative to a scale 37. The meter 34 also includes a second set of windings 38, 40, and 42 in which the windings 38 and 42 are fixed in position while the winding 40 is secured to the armature shaft 36.

The windings 38, 40, and 42 are connected in series with the secondary winding of a second transformer 44. The circuits controlling this second transformer 44 are similar to the circuit connections to the transformer 26. Thus, the primary of the transformer 44 is connected in series with an openly biased switch 46 and a battery which preferably is the battery 24. The operation of the switch 46 is controlled by a relay 50 connected in series with the openly biased switch 52 and a battery 54. The cam 56 controls the frequency of the make-and-break operation of the switch 52.

The cams 10 and 56 are each driven at speeds proportional to magnitude of two variables whose instantaneous ratio is to be indicated and/or measured by the meter 34. Also, these cams are designed so that the cycle of operation of their associated switches is such that they remain open for approximately one half a cycle and are closed for the remaining half of the cycle. The cycle of operation of the relay switches 20 and 46 are similar to that of the cam-controlled switches 12 and 52. When the switch 20 is closed the resulting build up of the electric current flow through the transformer primary induces a current wave or impulse in the transformer secondary circuit. Similarly, when the switch 20 opens, the interruption of the current flow in the transformer primary circuit induces a current impulse in the secondary circuit but in the opposite direction from the previous current impulse. Thus, the frequency of the current impulses or waves in the secondary circuit of the transformer 26 is proportional to the frequency of the make-and-break operation of the switch 20 which, in turn, is proportional to the speed of rotation of the cam 10. Similarly, the frequency of the current impulses in the secondary circuit of the transformer 44 is proportional to the speed of the make-and-break operation of the switch 46 and the speed of the cam 56. The cycle of the make-and-break operation of the switch 20 or 46 and the frequency and relative position of the various current impulses in the secondary circuit of the associated transformer is graphically illustrated in Fig. 2.

The meter 34 comprises a freely pivoted armature 36 upon which are mounted the two movable coils 30 and 40. The coil 30 is rotatable between two axially alined fixed coils 28 and 32 and has a stable or neutral position corresponding to the full line position of the pointer 35 as illustrated in the drawing. The torque interaction between the coils 28, 30, and 32 upon the current flow therethrough is similar to that occurring in a dynamometer-type A. C. voltmeter or ammeter. That is, the coil 30 tends to rotate to a position in which the magnetic field of this coil is substantially alined with the magnetic field created by the fixed coils. The torque tending to rotate the movable coil to this position depends on the magnitude of the current flow and upon the extent of the deflection of the coil from this stable position. That is, for a current flow of constant average magnitude the turning torque on the movable coil 30 is a maximum when the magnetic fields or axes of the movable coil and its associated fixed coils are substantially at right angles and the torque gradually decreases to zero as the movable coil rotates to a stable position in which its magnetic field is alined with the magnetic field created by the fixed coils. Also for a fixed relative angular position of the coils the torque tending to rotate the movable coil depends on the magnitude of the current flow through the coils and varies approximately with the square of this current flow.

The torque reaction of the coils 38, 40, and 42 is similar to that of the coils 28, 30, and 32 except that the movable coil 40 has a stable or neutral position 90° from that of the coil 30. Thus, as illustrated, each of the coils 30 and 40 has its axis perpendicular to the armature shaft 36 but the axes of these coils are so orientated that they extend in transverse directions. Also the axis of the alined fixed coils 28 and 32 is parallel to the axis of the alined fixed coils 38 and 42. As a result, upon a current flow through both sets of coils the torque tending to rotate the coil 30 is opposed by the torque tending to rotate the coil 40. In addition, rotation of the armature shaft 36 in either direction results in an increase in the torque opposing armature shaft rotation in that direction and in a decrease in the torque urging movement in that direction. The torque characteristics of the coils 30 and 40 are graphically illustrated in Fig. 3 in which the full lines indicate the variation in the magnitude of the torque action on each coil 30 and 40 for different positions of the armature shaft and for a constant and substantially equal average current flow through each coil. It should be noted that this graph illustrates only the absolute magnitude of the torque acting on each coil 30 and 40 and since these torques are oppositely directed the point of intersection A of the torque curves indicates not only the point at which the torque action on each coil is equal in magnitude, but this point defines the equilibrium position of the armature shaft.

If now the cam 56 increases in speed the frequency of the current impulses through the coils 38, 40, and 42 will correspondingly increase, thereby increasing the torque tending to rotate the coil 40. Accordingly, there will be a further deflection of the armature shaft 36 and the pointer 35 away from the full line position of Fig. 1 until there is a sufficient increase in the torque acting on the coil 30 and a sufficient decrease in the torque acting on the coil 40 to again establish equilibrium. This is graphically illustrated in Fig. 3 in which the new torque curve for the increased current through the coil 40 is indicated in dotted lines and the initial increase in the torque acting on the coil 40 is represented by the torque increment AB. This torque unbalance AB results in a rotation of the armature shaft in the direction of this torque until the torque acting on the coils 30 and 40 respectively increase and decrease to the point C, the new equilibrium position.

Similarly, if the cam 10 increases in speed there will be a corresponding increase in the torque acting on the coil 30 thereby moving the armature 36 toward the full line position. This latter movement of the armature 36 gradually causes a reduction in the torque acting on the coil 30 and an increase in the opposite torque acting on the coil 40 until a new equilibrium position is reached.

With the meter 34 balanced in any position, if the frequency of the impulses through coils 30 and 40 are proportionately increased or decreased there will be no change in the position of the pointer 35 since for each coil the torque action is a similar function of the current flow. Thus, in any equilibrium position of the coils 30 and 40, these coils are subjected to equal but opposing torques induced as a result of the particular current flowing through each coil. If the frequency of the current impulses through the coils 30 and 40 are simultaneously doubled the average value of the current through each of these coils will be correspondingly doubled and accordingly, the increase in the torque acting on each of these coils will be the same so that there will be no change in the position of the armature 36 and its pointer 35. In other words, each position of the pointer 35 corresponds to a definite ratio of the speed of the cam 10 to the speed of the cam 56.

At this point it should be noted that the indications of the meter 34 are independent of the voltage of the various batteries. Thus, the batteries 16 and 54 need only operate the relays 18 and 50 respectively. The primary of the transformers 26 and 44 are connected to the same battery 24 and, therefore, any variation in the voltage of this battery has the same effect on the average value of the current through both sets of windings of the meter 34 and, therefore, will have no effect on the indication of this meter.

The cams 10 and 56 may be driven by any two variables whose ratio is to be indicated or measured. If the cam 10 is rotated at a speed proportional to the speed of a vehicle driven by an internal combustion engine and the cam 56 is rotated at a speed proportional to the rate of fuel flow or consumption of the engine then the deflection of the pointer 35 will be a measure of the instantaneous value of the fuel mileage being obtained.

For measuring the fuel mileage of a vehicle, the cam 10 may be suitably driven from the vehicle drive shaft and any suitable form of fuel flow meter may be used for rotating the cam 56 proportional to the fuel flow. One form of meter is illustrated in Figs. 4 and 5. This meter consists of a rotor 58 secured to a shaft 60 axially disposed within a throat of the venturi 62 connected into the fuel line 64. With this construction the rotor and shaft rotate at a speed proportional to the fuel flow through the line 64. The shaft 60 preferably is metallic and a fiber or insulating plug 66 is inserted therethrough. A pair of spring contact fingers 68 and 70 are resiliently biased against the shaft 60 and these contacts may be connected in series with the relay 50 and battery 54 by means of suitably insulated terminals 72 and 74. Rotation of the shaft 60 and its fiber plug 66 serves to make and break the circuit of the relay 50 in proportion to the speed of rotation of the shaft. Accordingly, this construction is equivalent to the cam-operated switch 52 schematically illustrated in Fig. 1.

The meter illustrated in Fig. 1 obviously is not limited to the above described use of measuring the fuel mileage of a vehicle but this meter can be used to measure and/or indicate the instantaneous ratio of any two variables. In addition, other variables may be introduced, for example, the output of the transformers 26 or 44 may be controlled by a third factor by controlling the coupling between the primary and secondary windings of these transformers. Fig. 6 illustrates an arrangement for this purpose including an adjustable transformer 44' which, for example, may be substituted for the transformer 44 in Fig. 1. Obviously, a similar adjustable transformer could be substituted for the transformer 26 of Fig. 1. A Bourdon tube 76 is subjected to a fluid pressure proportional to said third variable and this tube is connected by suitable linkage to a shield 78 adapted to adjust this shield relative to the core of the transformer 44' so that the amount of coupling between the windings of the transformer is proportional to this third variable. In this way the adjustable shield controls the magnitude of the current impulses in the secondary circuit of the transformer 44' while the cam 56 controls the frequency of these impulses. As a result the torque tending to turn the movable coil 40 connected in the secondary circuit of the transformer 44' is proportional to the variables controlling the cam 56 and the adjustable shield 80.

An example of a use of Fig. 6 is for indicating the specific fuel consumption of an internal combustion engine. This specific fuel combustion is equal to the fuel consumed per horsepower output per unit of time. Thus, the specific fuel consumption is proportional to Q/NT where Q is the rate of fuel flow to the engine, N is the speed of rotation of the engine, and T is the torque output of the engine. Therefore, if the adjustable transformer 44' is substituted in Fig. 1 and its adjustable shield 80 is controlled by the torque output of the engine while cam 56 is operated at a speed proportional to the speed of the engine and the cam 10 is operated at a speed proportional to the rate of fuel flow then the deflection of the pointer 35 will be proportional to the instantaneous value of the specific fuel consumption of the engine.

Fluid pressure torque meters adapted for operation of Bourdon tube 76 are quite common, for example, as illustrated in Patent No. 2,289,285 to R. Chilton. Therefore, it is not deemed necessary to illustrate such a torque meter.

Instead of using an adjustable transformer 44' the secondary of a fixed transformer 44" could be connected across a potentiometer winding 82 with one of the sets of windings of the meter 34 adjustably connected across this potentiometer as illustrated in Fig. 7. The adjustable contact 84 of the potentiometer could be controlled by a "Sylphon" bellows 86 responsive to the same torque meter fluid pressure mentioned in connection with Fig. 6. The arrangement is such that upon a given input to the transformer primary, the voltage applied to the associated set of windings of the meter 34 is proportional to this torque.

As a further modification one of the sets of windings of the meter 34 could be connected to a constant source of voltage whereby the other set of windings would control the deflection of the pointer 35 in proportion to the factor controlling the current flow through this latter set of windings. For example, with a constant current flow through the windings 38, 40, and 42 and with the windings 28, 30, and 32 connected to an adjustable transformer in which the transformer coupling is controlled by the output torque of an engine and in which the frequency of the current impulses in the secondary of this transformer are controlled by the speed of the engine then the deflections of the meter or the pointer 35 are proportional to the product of the speed and torque, or to the horsepower of the engine.

It should be noted that although each of the two sets of windings of the meter 34 has been illustrated and described as connected in series with the secondary of the transformer whose output is controlled by a make-and-break switch, the invention is not so limited; for example, other means could be used to vary the current flow to each set of windings of the meter 34 in proportion to a particular condition or factor. If the average value of the current flow through one set of windings is adjusted in proportion to one condition and the average value of the current flow through the other set of windings is adjusted in proportion to another condition, then the deflection of the meter will be in proportion to the ratio of these conditions. Thus, it is apparent that a very simple meter has been disclosed for measuring and/or indicating the ratio of two variables. Furthermore, if the current flow through one set of windings of the meter 34 is maintained constant and the average current flow through the other set of windings is varied in proportion to a variable condition, then the deflection of the meter will be in proportion to the magnitude of this condition.

While I have described my invention in detail in its present embodiment, it will be obvious to those skilled in the art, after understanding my invention, that various changes and modifications may be made therein without departing from the spirit or scope thereof. I aim in the appended claims to cover all such modifications and changes.

I claim as my invention:

1. An indicating system comprising an armature shaft, a pair of coils rotatable with said shaft, a common source of electric energy for said coils, means operable to supply electric current to one of said coils in a series of current impulses, means operable to vary the frequency of said current impulses in response to changes in a condition, means operable to supply electric current to the other of said coils in a series of current impulses, means operable to vary the frequency of the current impulses to said other coil in response to changes in a second condition, means cooperating with each coil to subject said coils to opposed shaft-rotating torques in response to the current flow through the coils, and means operable to vary the magnitude of the current impulses to one of said coils in response to changes in a third condition.

2. An indicating system comprising an armature shaft, a pair of coils rotatable with said shaft, a pair of transformers, the secondary of one of said transformers being connected to one of said coils and the secondary of the other transformer being connected to the other coil, the primaries of said transformers being connected to a common source of electric energy, means operative to make and break the primary circuit of one transformer at a frequency responsive to changes in one condition, means operative to make and break the primary circuit of the other transformer at a frequency responsive to changes in a second condition, and means cooperating with each coil to subject said coils to opposed shaft-rotating torques in response to the current flow through the respective coils.

3. Means for indicating the ratio between two conditions, said means comprising a rotatable member, a pair of coils rotatable with said member, a relatively fixed coil disposed adjacent to each of said rotatable coils and electrically connected in series therewith, a common source of electric energy for said coils, the axis of one of said rotatable coils being aligned with the axis of its associated serially-connected fixed coil at one rotative position of said member and the axis of said other rotatable coil being aligned with its associated serially-connected fixed coil at a different rotative position of said member, means operable to cause cyclic variations in the magnitude of the electric current flowing in one of said rotatable coils and its associated fixed coil and to cause the frequency of said cyclic variations to vary in response to changes in one of said conditions, and means operable to cause cyclic variations in the magnitude of the electric current flowing in the other of said rotatable coils and its associated fixed coil and to cause the frequency of said cyclic variations to vary with changes in the other of said conditions.

4. Indicating means comprising a rotatable member, a pair of windings rotatable with said member, a pair of transformers, each having their output connected to one of said windings, a common source of electric energy connected to the input of said transformers, means operable to cause the electric current in the input circuit of one of said transformers to flow as a series of impulses and to cause the frequency of said impulses to vary in response to variations in a first condition, means operable to cause the electric current in the input circuit of the other transformer to flow as a series of impulses and to cause the frequency of said latter impulses to vary in response to variations in a second condition, and means cooperating with each winding to subject said windings to opposed torques about the axis of said member in response to the current flow through said windings.

5. Means for indicating the ratio between two conditions, said means comprising a rotatable member, a pair of coils rotatable with said member, a relatively fixed coil disposed adjacent to each of said rotatable coils, a common source of electric energy for said coils, means operable to cause cyclic variations in magnitude of the electric current flowing in one of said coils and to vary the frequency of said cyclic variations in response to changes in one of said conditions, and means operable to cause cyclic variations in the magnitude of the electric current flowing in the other of said coils and to vary the frequency of said latter cyclic variations in response to changes in the other of said conditions, the current flow through each rotatable coil and its associated fixed coil being operative to subject each rotatable coil to a torque opposing the torque on the other rotatable coil such that the magnitude of each said torque decreases upon rotation of said member in its direction.

HERMAN D. JACKES.

REFERENCES CITED

The following references are of record in the file of this patent:

UNITED STATES PATENTS

| Number | Name | Date |
| --- | --- | --- |
| 1,033,409 | Joly | July 23, 1912 |
| 1,677,378 | Albrecht | July 17, 1928 |
| 2,206,416 | Mathes | July 2, 1940 |
| 1,809,683 | Fitzgerald | June 9, 1931 |
| 835,461 | Northrup | Nov. 6, 1906 |
| 1,634,546 | Lines | July 5, 1927 |
| 2,248,504 | Kenny | July 8, 1941 |
| 2,342,947 | Lingel | Feb. 29, 1944 |

FOREIGN PATENTS

| Number | Country | Date |
| --- | --- | --- |
| 270,612 | Germany | Feb. 21, 1914 |